United States Patent
Lund (10) Patent No.: US 6,322,153 B1
(45) Date of Patent: Nov. 27, 2001

(54) SELF-SUSPENDING WHEEL

(76) Inventor: Morten Andre Lund, 1291 Simpson Way, Suite D, Escondido, CA (US) 92029-1434

(*) Notice: Subject to any disclaimer, the term of this patent is extended or adjusted under 35 U.S.C. 154(b) by 0 days.

(21) Appl. No.: 09/607,199

(22) Filed: Jun. 30, 2000

Related U.S. Application Data (63) Continuation-in-part of application No. 09/346,640, filed on Jul. 1, 1999, now abandoned.

(51) Int. Cl.$^7$ .................................................... A63C 17/22
(52) U.S. Cl. ....................... 301/5.3; 301/110.5; 152/40; 152/44; 152/46
(58) Field of Search ............................... 301/5.1, 5.3, 5.7, 301/105.1, 110.5, 110.6; 152/17, 40, 44, 45, 46, 47, 48, 49, 50, 51; 280/11.22, 11.23, 124.166, 124.169; 267/276

(56) References Cited

U.S. PATENT DOCUMENTS

| | | |
|---|---|---|
| 1,185,098 | 5/1916 | Hopkins . |
| 5,393,078 | 2/1995 | Bourdeau . |
| 5,411,287 | 5/1995 | Henschen . |
| 5,573,309 | 11/1996 | Bekessy . |

FOREIGN PATENT DOCUMENTS

| | | |
|---|---|---|
| 2676397 A1 | 5/1991 | (FR) . |
| 29276 A1 | of 1896 | (GB) . |

*Primary Examiner*—Russell D. Stormer
(74) *Attorney, Agent, or Firm*—Gene Scott-Patent Law & Venture Group (57) ABSTRACT

An outer wheel, tire and rim, is mounted onto an inner wheel or hub and is adapted for low friction rotation on the hub. An arm is pivotally attached to the inner wheel and carries a receiver for the axle upon which the wheel is mounted so that the axle is positionable over an arc of rotation about the pivot point of the arm. The arm is biased by an elastomeric body so that as the arm moves over its arc of rotation, the elastomeric body is compressed. As the wheel rotates under load, road shocks are transferred to the biasing device which acts as a shock absorber.

9 Claims, 9 Drawing Sheets

SELF-SUSPENDING WHEEL

This application is a continuation in part (CIP) of a copending utility patent application entitled, "Self-Suspending Wheel," Ser. No. 09/346,640, having a filing date of Jul. 1, 1999, now abandoned.

BACKGROUND OF THE INVENTION

1. Field of the Invention

This invention relates generally to wheel suspensions, and more particularly to a self-suspending wheel with a shock absorbing element contained within the center of the wheel itself.

2. Description of Related Art

The following art defines the present state of this field:

Gagnon, et al., U.S. Pat. No. 5,305,496 describes a caster with two spaced apart wheels with an elastomeric torsional shock and vibration isolating suspension between them. The wheel axis is spaced longitudinally from a bearing axis to subject elastomeric disks positioned between the wheels to torsional shear stresses to help absorb shocks and vibrations. A snubber is provided for limiting the angular motion of the wheels about a bearing axis.

Braeger, et al. U.S. Pat. No. 5,394,589 describes three embodiments of a shock-isolating caster. A surface-effect damper engages at least one of a wheel element and an intermediate structural member to dampen vibration and shock loads which would otherwise be transmitted from the wheel element through the intermediate structure and mounting member to the equipment supporting cart. A first embodiment positions the damper between an outer wheel rim and an inner wheel hub. Second and third embodiments mount the wheel on a pivotable arm and dampen the movement of the arm. Capability to adjust damping levels is provided.

Kindstrand, et al., U.S. Pat. No. 5,493,755 describes a caster with a stationary hub having a bearing between the hub and a floor engaging wheel ring which allows the wheel ring to rotate relative to the hub. Torsional elastomeric elements mount the hub between spaced support arms radially inward of the bearing and are positioned eccentrically relative to the axis of rotation of the wheel ring so as to suspend the hub resiliently between the arms. In an alternate embodiment, the hub is cantileverd from a single support arm.

Lazarevich, et al., U.S. Pat. No. 5,704,621 describes a suspension system for an in-line roller skate in which the suspension system independently controls each wheel of the skate. The suspension system components for each wheel includes a swing arm that is pivotally mounted to a frame attached to a boot of the skate. The wheel is rotatably mounted on a rotation axle between opposing legs of the swing arm. Two C-shaped spring stays are secured to opposing side rails of the frame where one leg of each spring stay travels through a stand-off rigidly secured to one of the opposing legs of the swing arm. A helical spring surrounds the leg of each spring stay between the stand-off and the frame. When the wheel encounters a bump in the ground terrain, the swing arm pivots up and the helical springs are compressed between the stand-off and the frame providing shock absorption. A rebound a stop prevents the swing arm from pivoting too far downward. A jounce stop prevents the swing arm from pivoting too far upward.

Gray, U.S. Pat. No. 4,403,784 describes a roller skate formed of a plate with an upper surface to receive a shoe and having a forward and rearward downwardly extending suspension housing, each housing having an opening therethrough, an axle extending through each suspension housing opening having a means at each end for receiving a skate wheel, a first and second elastomeric member received in each suspension housing in spaced apart relationship, each of the elastomeric members having an opening receiving the axle, bolts extending through threaded openings at the top of the suspension housing, the ends of the bolts engaging the upper surfaces of the elastomeric members so that the compressive force applied by the elastomeric members to the axle may be adjusted by threadably positioning the bolts. Another arrangement includes each axle in two portions hinged in the middle so that each roller skate wheel is independently resiliently supported relative to the skate body.

Hager, U.S. Pat. No. 4,685,174 describes a shock absorbing caster wheel in which the wheel support bracket is pivotally mounting on a caster bracket and a spring engages the wheel support bracket and caster bracket to absorb shocks on the caster wheel. Vibration dampening pads on the caster bracket slidably engage wall surfaces on the wheel support bracket to dampen oscillation of the wheel support bracket.

Burns, U.S. Pat. No. 5,823,543 describes a roller skate shock absorber system in at least two double pivot mechanisms spaced longitudinally from front to back along a skate shoe; a truck device including a plurality of wheels interconnected with the double pivot mechanisms; each of the double pivot mechanisms including a first pivot mounted to the skate shoe, a pivot member rotatably connected to the first pivot and having a second pivot rotatably attached to the truck device; and at least one resilient member dispose between the skate shoe and the truck mechanism for biasing at least one of the pivot mechanisms with its first and second pivots generally vertically aligned to provide a firm push-off force.

Hopkins, U.S. Pat. No. 1,185,098 describes a vehicle wheel with a central hub box providing a pair of spaced thrust disks, a hub casing providing conical ends, annular members provided with inclined portions for wedgingly engaging within said conical casing ends, each annular member comprising a bearing flange for engaging the corresponding thrust disk and a cylindrical container, and cushioning members positioned in said cylindrical containers in engagement with said hub box.

Bourdeau, U.S. Pat. No. 5,393,078 describes a skate including a chassis formed by an upper horizontal plate solidly joined to the sole of a shoe by fasteners and a lower part running perpendicular to the plate and including at least one lateral flange on which the wheels are disposed by transverse axles solidly joined to the chassis, constituting a rolling train, each of the wheels having a hub in fixed rotation, which is disposed on the axle and which supports a bearing interpolated between the hub and a tire. The hub of the wheel is equipped with an arrangement which allows for its angular deflection relative to its median horizontal plane. The arrangement for angular deflection includes the transverse axle which is horizontally off-center in relation to the virtual center of the wheel which can cooperate by abutment with a fixed axle solidly joined to the chassis which passes through it, and which supports an elastic recoil device.

Henschen, U.S. Pat. No. 5,411,287 describes a torsion axle for a vehicle including an elongated axle tube enclosing first stage torsion shafts and second stage torsion shafts all having a common axis, and a metal tube or a non-circular portion of the axle tube and a plurality of resilient rubber rods confine each of the shafts for torsionally resisting rotation of the shaft. Each first stage metal tube is secured to the surrounding axle tube, and each second stage metal tube is connected to the corresponding first stage shaft. A stud projects outwardly from each second stage metal tube through a slot within the surrounding axle tube to limit rotation of the second stage tube with the first stage shaft, and a crank arm and eccentric spindle are secured to the outer end portion of each second stage shaft for receiving a wheel. In modifications, the first stage shafts for both the left and right wheels are connected as one shaft, and a hydraulic winch cable and spool provide for pre-rotating the one shaft or the axle tube to lower and raise the vehicle.

Bekessy, U.S. Pat. No. 5,573,309 describes an in-line roller skate wheel and truck in which an elongated truck frame with a pair of spaced longitudinal side rails mount a plurality of roller wheels. At least one of the roller wheels has a hub core with a coaxial tire receiving shoulder. A tapered tire deflection controlling rim extends circumferentially about the shoulder, with rim side walls extending radially outward from a wide base at the tire receiving shoulder to a narrow peripheral surface. An annular resilient tire is mounted to the hub, engaging the tire receiving shoulder and encasing the tapered tire deflection controlling rim. The tire includes an annular ground engaging surface section and an annular high friction shoulder situated radially inward and axially outward of the ground engaging outer surface. The rim and tire configuration aid in maximizing speed and control in turns. Another one of the in-line roller wheels, situated at the heel end of the truck includes a tire of a slightly reduced diameter and is formed of a resilient material with a hardness value greater than the remaining tires on the truck. It also includes recessed braking dimples on its ground engaging surface to aid in approximating heels-forward "skid" stopping in a manner similar to stopping methods used by ice skaters.

Berges, FR2676397-A1 describes an integrated suspension wheel and shock absorber formed from a rigid rim which supports a tire. Four rings of cylindrical form join the rim to the hub. Paddle blades located radially between the suspension rings increase transmission of the torque. The rings serve progressively as shock absorbers. They are made of composite synthetic material having an elasticity calculated as a function of the required suspension. The material which fixes the rings to the rim and to the hub is a mono- or multi-component polyurethane.

Shepherd's Complete Specification, A.D. Dec. 21, 1896, No. 29,276. This reference was provided by the United States Patent and Trademark Office during prosecution of the parent case of this CIP.

The prior art teaches shock absorbers placed along a skate shoe, on a castor bracket, in a skate suspension housing, in a boot of a roller skate, in a hub cantilevered from an exterior support arm, and in other applications, as for instance, within a bicycle wheel hub. However, the prior art does not teach that the shock absorbing means may be fitted within the hub of the wheel with merely a single axle attached to a frame, to provide a highly compact and inexpensive shock system. The present invention fulfills these needs and provides further related advantages as described in the following summary.

SUMMARY OF THE INVENTION

The present invention teaches certain benefits in construction and use which give rise to the objectives described below.

The present invention provides a wheel having a tire mounted on a wheel rim and a central wheel hub adapted for low friction rotation through the use of bearings. A hub assembly within the wheel hub does not rotate. An arm is pivotally attached to the hub assembly and extends generally toward the center of the hub but is free to swing in an arc. The free end of the arm carries the axle to which the frame of a bicycle, skate, or the like, is mounted. A biasing device such as a spring, a pneumatic strut or an elastic body applies a force to the arm, urging the arm toward a rest position. As the wheel rotates under load, road shocks are transferred to the biasing device which acts as a shock absorber. A means for adjusting or fully canceling the effect of the biasing device is provided.

A primary objective of the present invention is to provide a wheel having advantages not taught by the prior art.

Another objective is to provide such a wheel having a shock absorbing capability built into the wheel hub.

A further objective is to provide such a wheel having a shock absorbing capability capable of supporting a static load as well as a dynamic load.

A still further objective is to provide such a wheel having a shock absorbing capability proportional to the degree of deflection of the wheel, i.e., increasing therewith.

A yet further objective is to provide such a wheel having a means for adjusting or fully canceling the effect of the shock absorbing capability.

A final objective is to provide such a wheel that fulfills these objectives in a construction that is competitive with, or exceeds the capabilities of the prior art, at a lower cost.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

The above described drawing figures illustrate the invention, a self-suspended and shock absorbed wheel apparatus 10 comprising an outer wheel portion 20 adapted for rotation about a concentrically positioned, inner wheel portion 30 where the inner wheel portion 30 provides a pivotally engaged extension arm 40 supported by an elastomeric body 70. The use of the word "arm" in this disclosure refers to either a single arm or multiple arms as either approach may be used to accomplish the objectives of the subject invention. The self-suspended wheel apparatus 10 may be configured for use with a roller skate, a bicycle or other devices. When used with a bicycle, the apparatus 10 may be mounted in a rear wheel in the bicycle frame, or in a front wheel mounted in a steering fork of the bicycle.

The outer wheel portion 20 is adapted, as will be described below, for rotation about the normally non-rotating, concentric, inner wheel portion 30. The inner wheel portion 30 pivotally engages the extension arm 40 which terminates at a free end 42. The extension arm 40, in the preferred embodiment, is a pair of arms, 40' and 40" which act in unison. The free end 42 of the extension arm 40 engages a singular wheel mounting axle 60 adapted for receiving the wheel mounting frame at the axle's extremities 62. A biasing means 70 engages the extension arm 40 and abuts a surface 32 of the inner wheel portion 30. The biasing means 70 is enabled by its elastic nature and strength, for supporting the wheel mounting axle 60 which, in turn, supports part of the weight of the conveyance that is carried by the wheel, and for absorbing mechanical shocks to the wheel. It is of particular interest and novelty to realize that the self-suspending wheel apparatus 10 and the frame 50 to which it is mounted are joined together solely by the singular wheel mounting axle 60.

Figure 1:
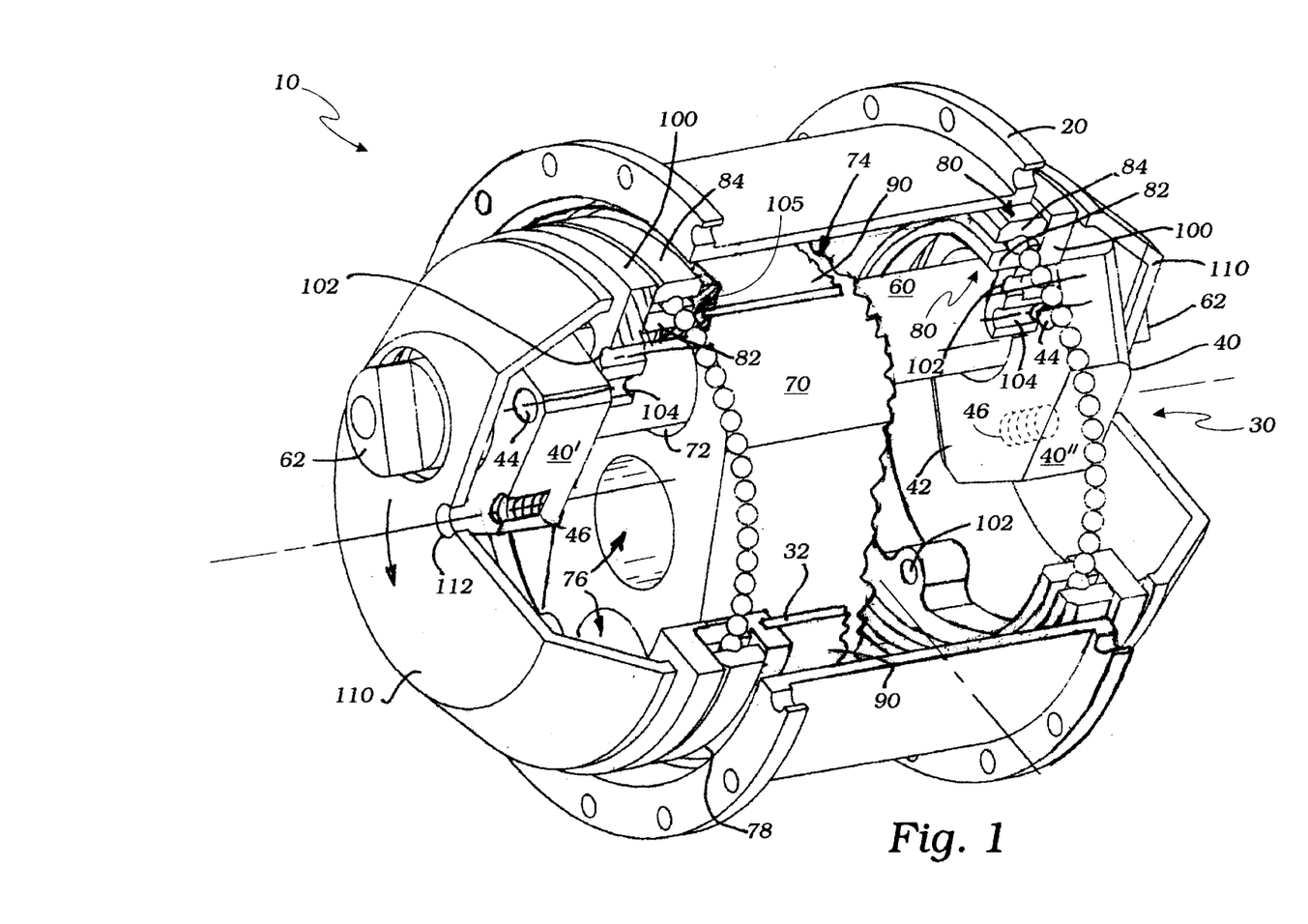
FIG. 1 is a partial cutaway perspective view of the preferred embodiment of the present invention.
Figures 2A, 2B:
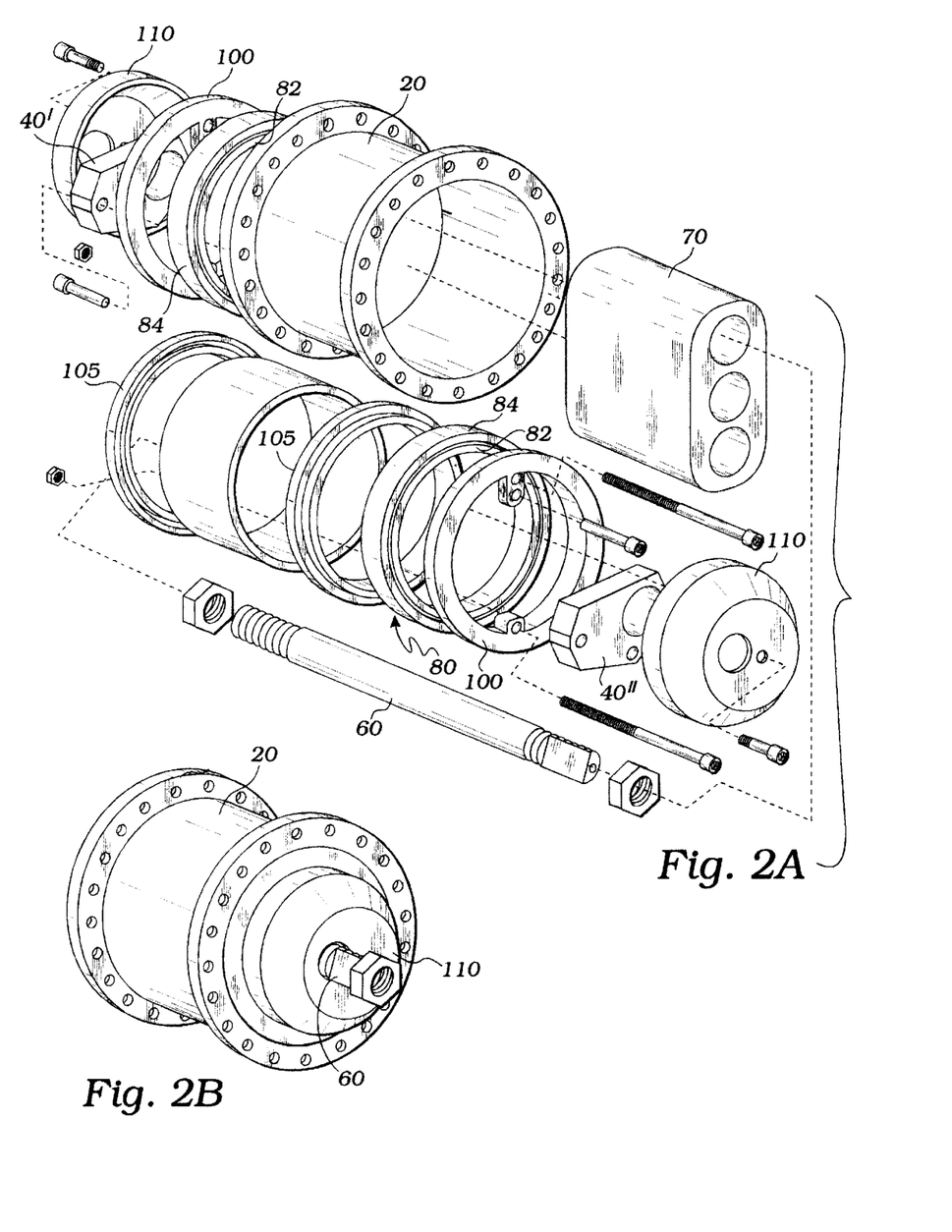
FIG. 2A is an exploded view thereof.
FIG. 2B is a the assembled apparatus.
Figure 3A:
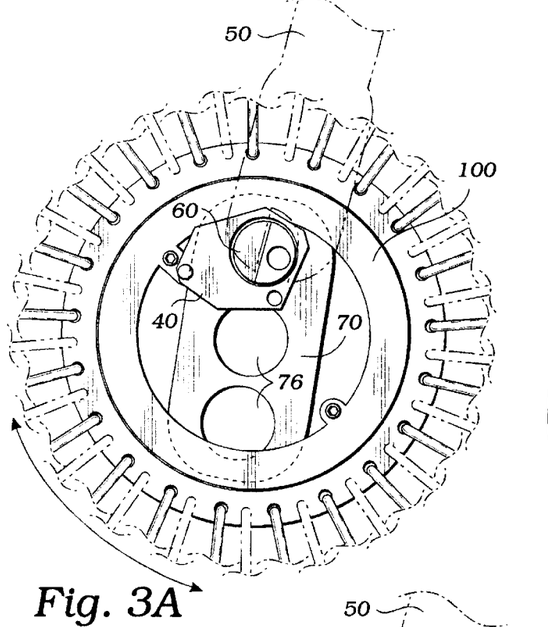
FIG. 3A is a side elevational view thereof in a relaxed position.
Figure 3B:
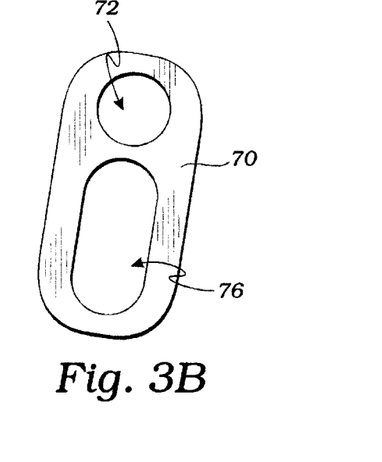
FIG. 3B is a side elevational view of an elastomeric part shown in the relaxed position corresponding with FIG. 3A.

In a preferred embodiment of the present invention, as shown in FIG. 1, the outer wheel portion 20 is represented by a hub housing as shown in the figures. The outer wheel portion 20 is joined to the inner wheel portion 30 by a pair of circular bearing assemblies 80 providing inner 82, and outer 84, bearing races as is well known in the art, and which enables the outer wheel portion 20 to rotate about the inner wheel portion 30. Preferably, the biasing means 70 is an elastomeric body of a generally rectangular shape providing an axle access hole 72 at a first end 74 for operatively receiving the mounting axle 60. One or more further holes or slots are positioned within and preferably through, the elastomeric body 70 and these are selected for providing an appropriate level of operable resilience as will be described below.

The inner wheel portion comprises a cylindrical shell 90 sandwiched between a pair of inner end rings 105. The end rings 105 slide into engagement with the inner bearing race 82 from opposing sides of the hub housing 26. A pair of outer end rings 100 also slide into the inner bearing race 82 from opposing outside directions and are fastened to each other and into place using common hardware in holes 102. The end rings 100 hold the bearings 80 in place and insure that the assembly is secured into the hub 20. Holes 104, also in end rings 100, each receive one pivot pin 106 as a press fit. Pins 106 extend laterally from holes 104 to engage holes 44 in extension arms 40. Arms 40 are able to pivot freely about pins 106. End caps 110 enclose the hub 20 from either side, and are fastened into place by common hardware using holes 112 and 46.

Figures 4A, 4B:
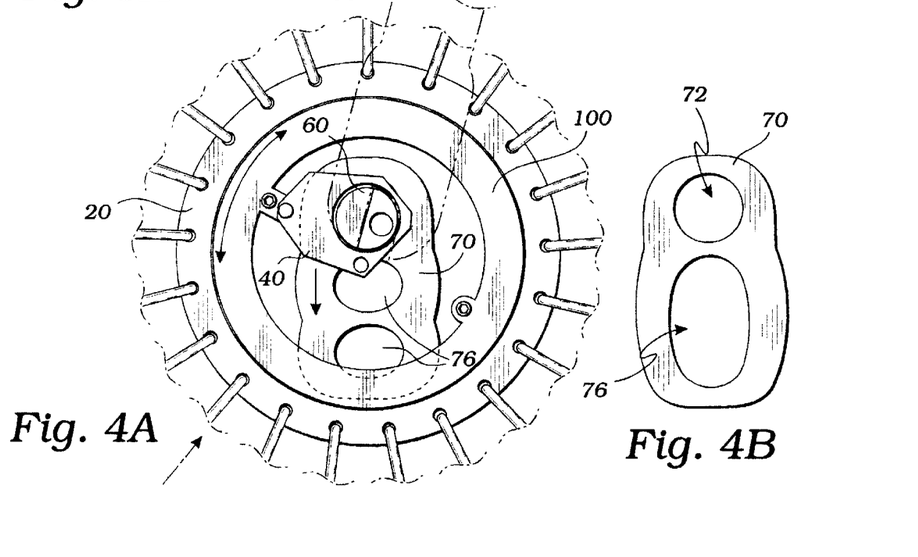
FIG. 4A is a side elevational view thereof in a partially stressed position.
FIG. 4B is a side elevational view of the elastomeric part shown in a partially compressed state corresponding with FIG. 4A.
Figures 5A, 5B:
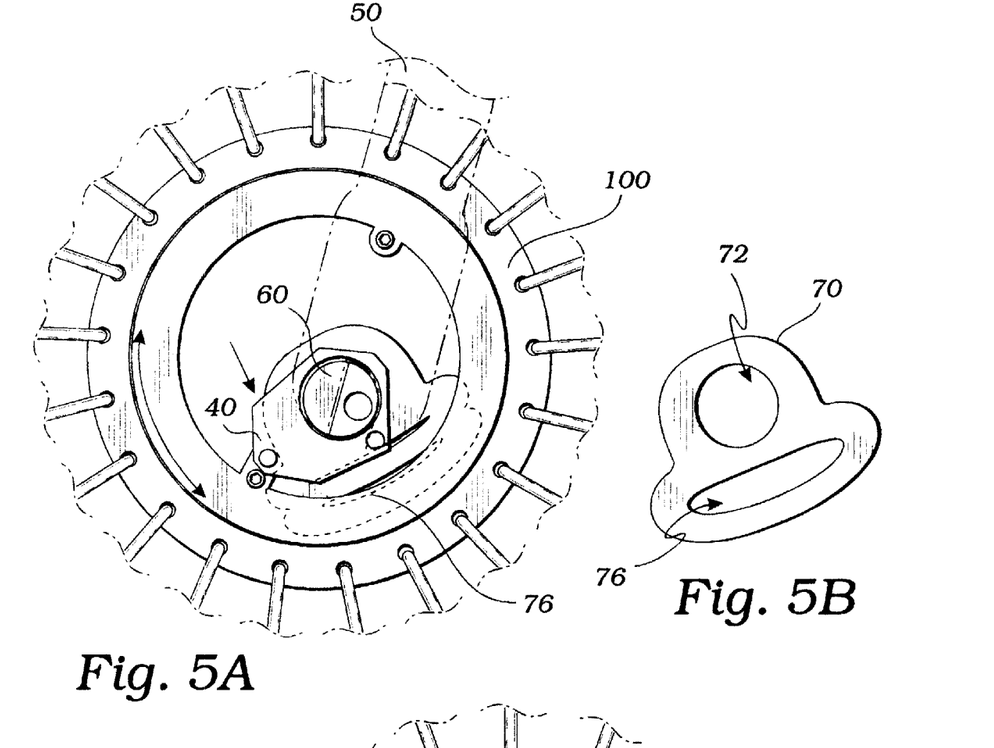
FIG. 5A is a side elevational view thereof in a fully stressed position.
FIG. 5B is a side elevational view of the elastomeric part shown in a fully compressed state corresponding with FIG. 5A.
Figure 6:
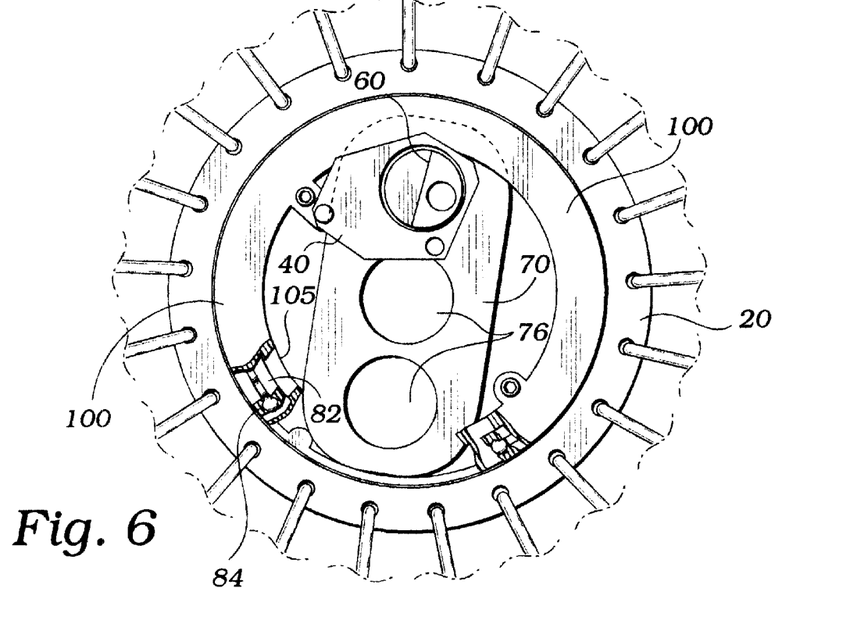
FIG. 6 is a side elevational view partially broken away to show ribs for centering the elastomeric part.
Figure 9:
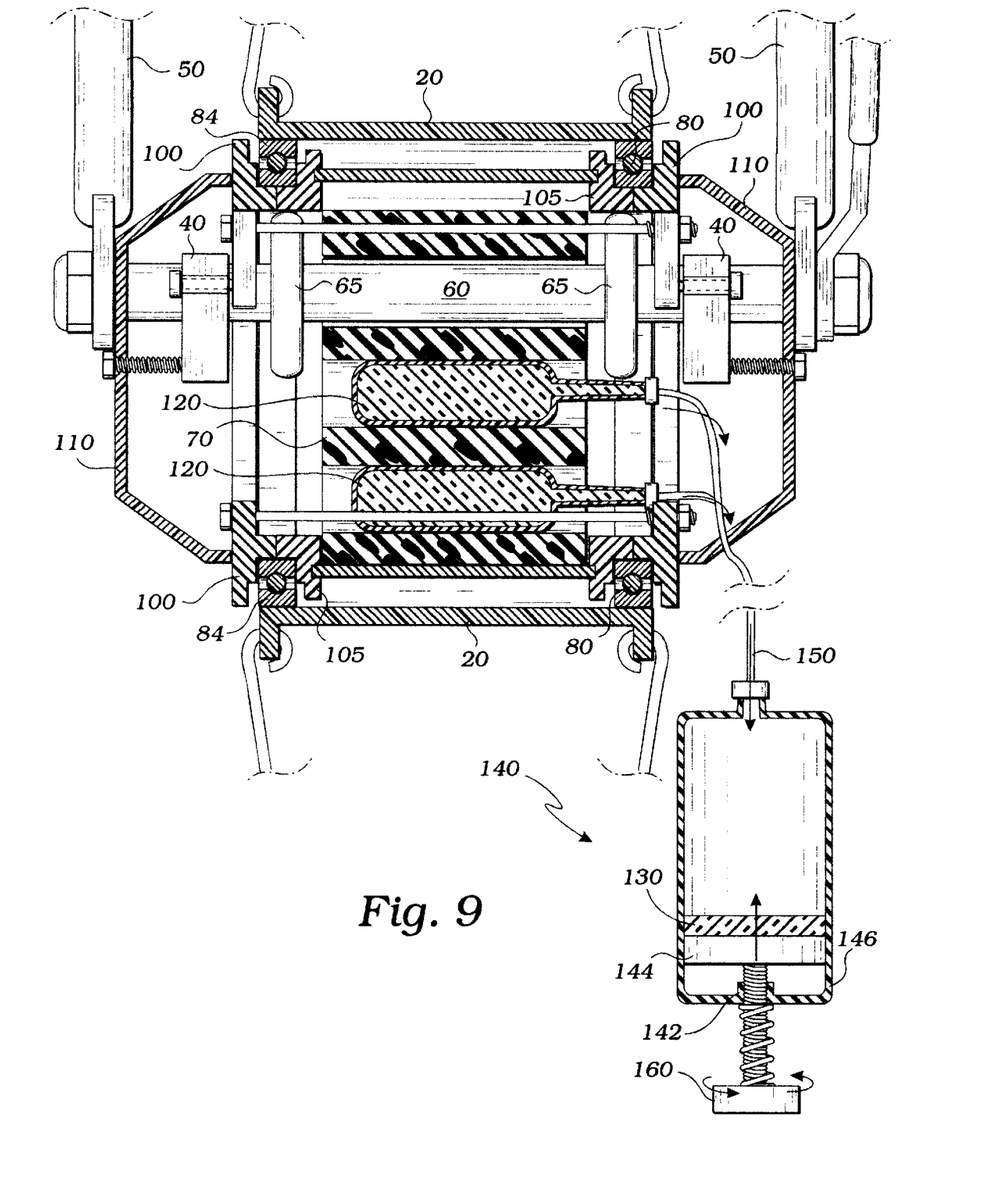
FIGS. 9, 10 and 11 are full sectional views showing a fluid and bladder arrangement of the invention, with bladders full, half empty and mostly empty respectively.+
Figure 10:
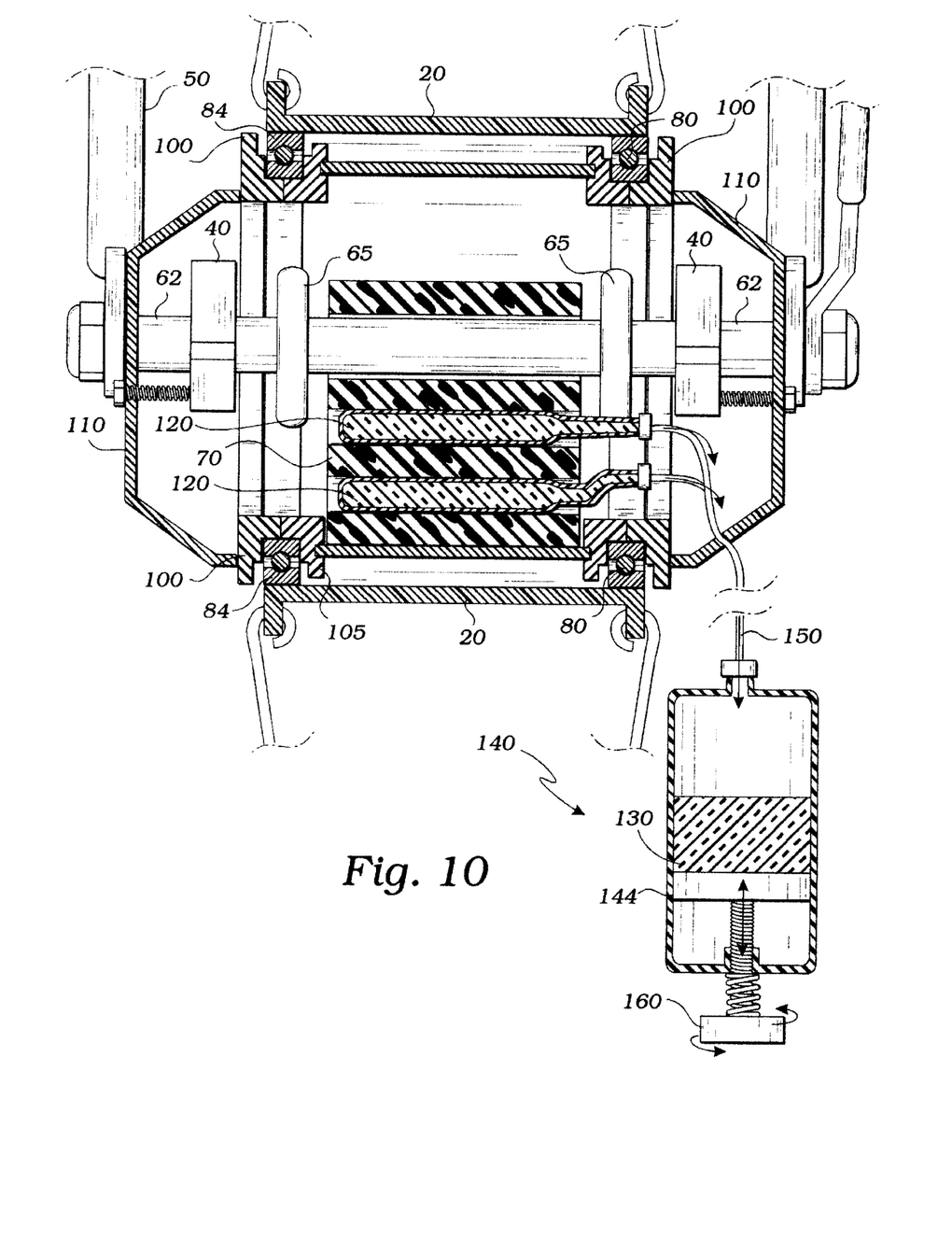
Figure 11:
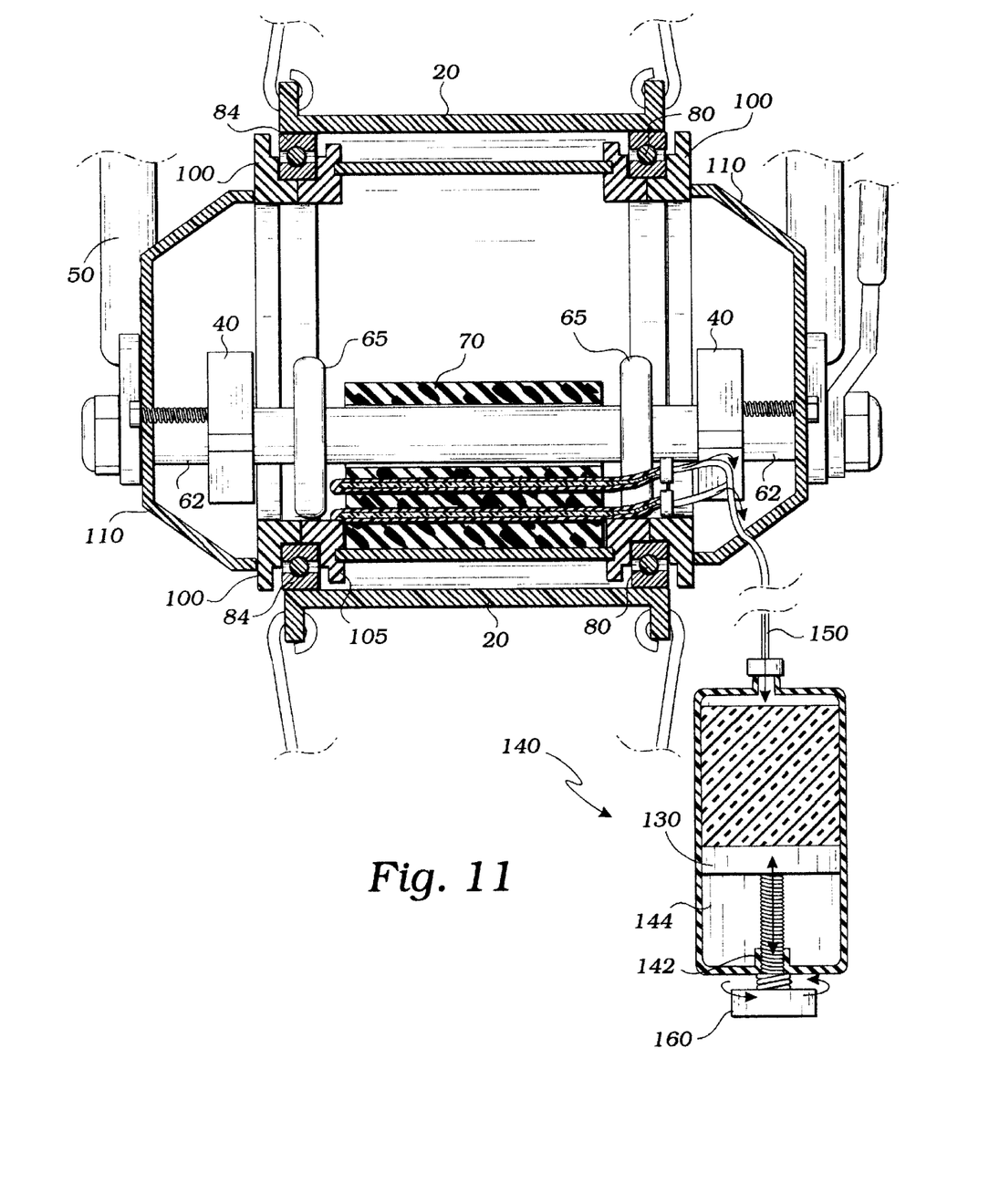

A second end 78 of the elastomeric body 70 abuts an interior surface 32 of the cylindrical shell 90 such that the mounting axle 60 is free to compressively distort the elastomeric body 70, as shown in FIGS. 4B, 5B and 11. Forces received from the ground surface upon which the wheel rides, are transferred through the bearings 80 to inside end rings 105 and shell 90 which, in turn transfer these forces to elastomeric body 70 and then to mounting axle 60 which supports the bicycle. Elastomeric body 70, being of an elastic nature, tends to deform in compression which, due to the relative positions of the axle 60 and the elastomeric body 70, causes the inner wheel portion 30 to rotate within hub 20. A pair of bumber o-rings 65 are mounted on the axle 60, as shown in FIG. 9–11 and provide elastic stop positioning of the axle at the ends of its excursion travel.

Figure 7:
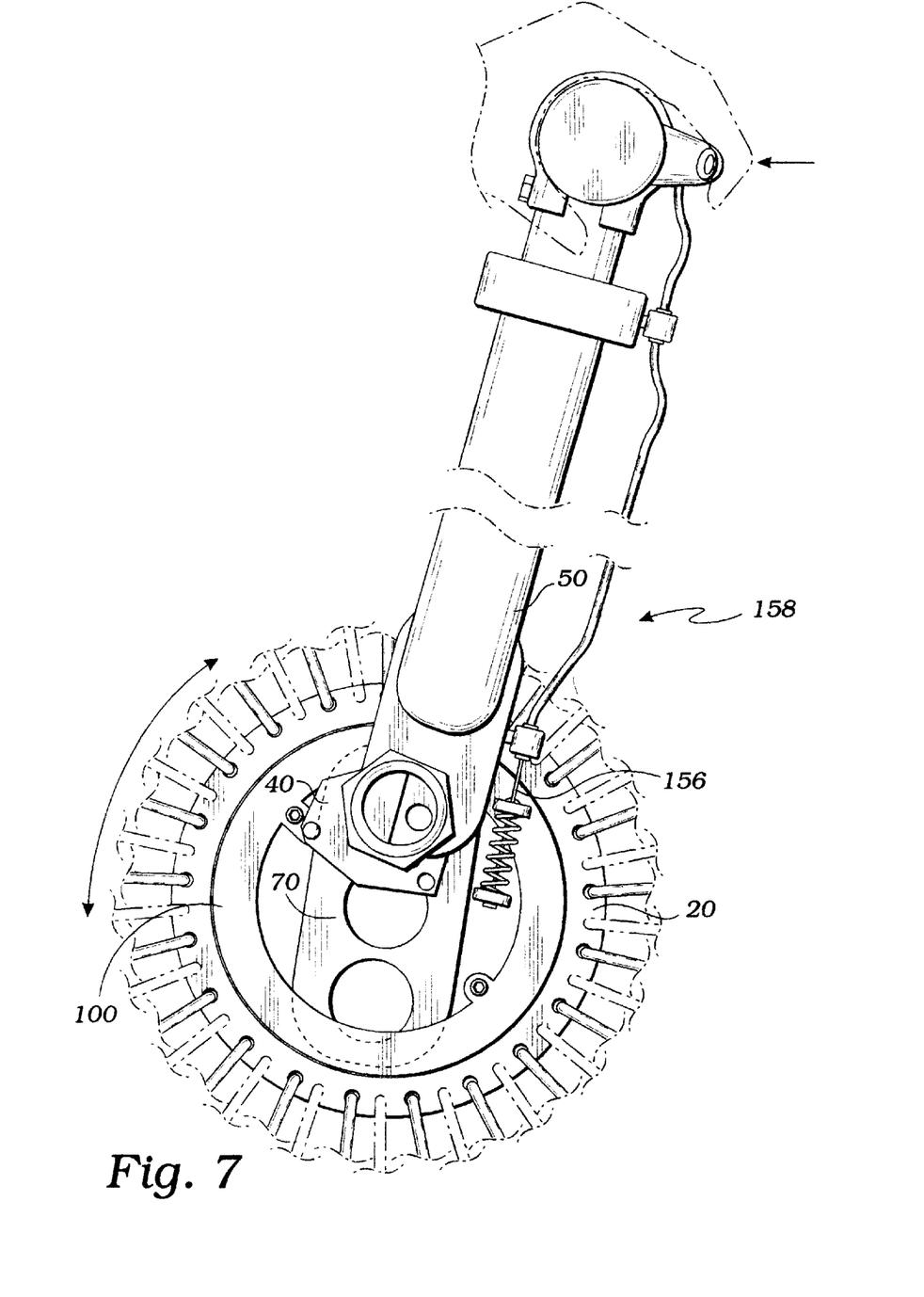
FIGS. 7 & 8 are side elevational views showing a fixture of the invention for pre-compressing the elastomeric part in relaxed and compressed states respectively.
Figure 8:
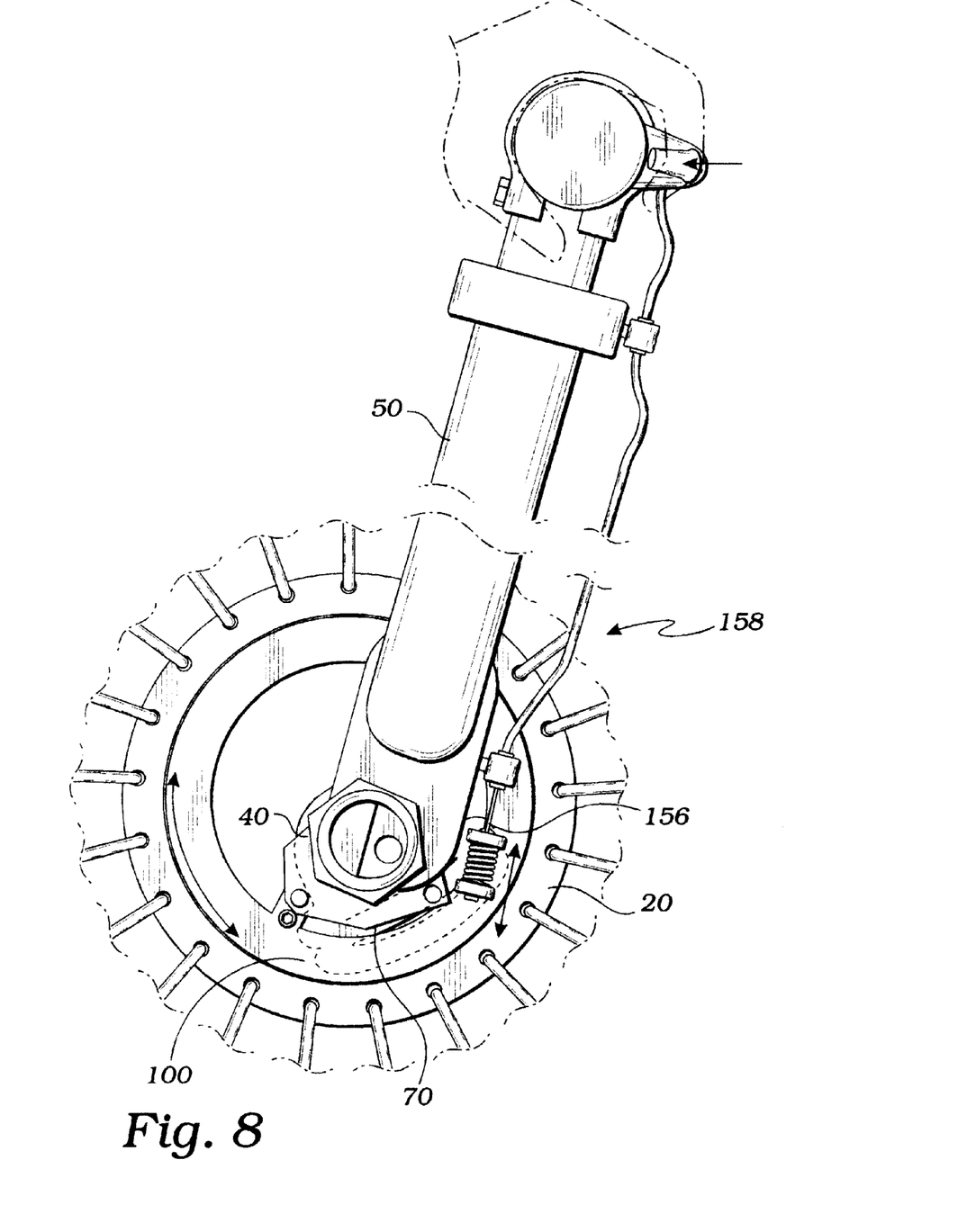

In an extension of the instant invention a means for partially and fully compressively distorting the elastomeric body 70 so as to disable the shock absorbing capability of the apparatus when desired, is provided. This is accomplished, preferably, through the use of a cable actuated means 158 for rotationally positioning the inner wheel portion 30 relative to the hub 20. A cable 156, which is preferably manually actuated is fastened to one of the end rings 100 as shown in FIG. 7. and by shortening this cable, a spring is caused to exert a rotational force on the end ring 100, thus compressing the elastomeric body 70 and reducing or eliminating its effect as an element in the suspension as shown in FIG. 8.

In a further extension of the above described invention, one or more flexible bladders 120 is engaged within the elongate slot 76 of the elastomeric body 70. The flexible bladder 120 receives a pressurized fluid 130 from, and exchanges the pressurized fluid 130 with, a fluid reservoir 140, for maintaining the flexible bladders 120 in a fluid-full state. The bladders 120 and the fluid 130 provide a means for controlling the rate by which the elastic body 70 recuperates from distortion after it has been compressed as described above. This effect is based upon the fact that it takes time for the fluid 130 to move from the bladder 120 through a delivery tube 150, for instance, to fluid reservoir 140. Preferably, the apparatus further comprises a means for adjusting 160 of the fluid pressure within the pressurized fluid 130 so as to adjust the responsiveness and compliance of the suspension. Such an adjusting means 160 is preferably a simple manually adjustable screw mechanism 142 capable of positioning a piston 144 in a cylinder 146 of the reservoir 140 as shown in FIGS. 9–11. Thus, adjusting the screw mechanism 142 for positioning the piston 144 allows a selected volume of the reservoir 140 to be available for storing the fluid 130 and thus changes the total pressure in the system, including the bladders 120 120, reservoir 140 and any delivery tube 150.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A self-suspended wheel apparatus for mounting in a wheel mounting frame, the apparatus comprising:

an outer wheel portion adapted for rotation about a non-rotating, concentric, inner wheel portion;

the inner wheel portion pivotally engaging an extension arm, the extension arm terminating at a free end thereof, the free end of the extension arm engaging a singular wheel mounting axle adapted for receiving the wheel mounting frame; and a biasing means engaging the extension arm and the inner wheel portion, the biasing means enabled for positioning the wheel mounting axle preferentially within the inner wheel portion, and further, for absorbing mechanical shocks to the wheel;

the self-suspending wheel apparatus and the frame joined together solely by the singular wheel mounting axle.

2. The apparatus of claim 1 wherein the outer wheel portion comprises a bicycle wheel rim and tire.

3. The apparatus of claim 2 wherein the inner wheel portion comprises a bicycle wheel hub adapted for supporting the outer wheel by a plurality of spokes mutually engaged therewith, and further including a cylindrical hub inner assembly within the wheel hub and engaged therewith by a bearing means enabling the wheel hub to rotate about the hub inner assembly.

4. The apparatus of claim 1 wherein the biasing means is an elastomeric body.

5. The apparatus of claim 4 wherein the elastomeric body is generally rectangular in shape, providing an axle access hole at a first end thereof for operatively engaging the mounting axle, and, adjacent the access hole, an elongate slot extending away from the hole and terminating adjacent a second end of the elastomeric body in positional opposition to the first end, the second end abutting an interior surface of the inner wheel portion such that the mounting axle is free to compressively distort the elastomeric body, forming an oval shape of the elongate slot.

6. The apparatus of claim 5 further comprising a means for partially and fully compressively distorting the elastomeric body.

7. The apparatus of claim 6 wherein the distorting means comprises a cable actuated means for rotationally positioning the inner wheel portion relative to the outer wheel portion.

8. The apparatus of claim 5 further comprising a flexible bladder engaged within the elongate slot of the elastomeric body, the flexible bladder receiving a pressurized fluid from, and exchanging the pressurized fluid with, a fluid reservoir, for maintaining the flexible bladder in a full-of-fluid state, the bladder and the fluid therein providing a means for controlling a rate of distortion recuperation of the distorted elastomeric body.

9. The apparatus of claim 8 further comprising a means for adjusting fluid pressure within the pressurized fluid.

* * * * *